(12) United States Patent
Ma (10) Patent No.: US 10,894,346 B2
(45) Date of Patent: Jan. 19, 2021

(54) METHOD FOR MANUFACTURING BUSBAR AND MANUFACTURING BUSBAR THROUGH THE SAME

(71) Applicant: DAE SAN ELECTRONICS CO., LTD., Hwaseong-si (KR)

(72) Inventor: Sangyoung Ma, Ansan-si (KR)

(73) Assignee: DAE SAN ELECTRONICS CO., LTD., Hwaseong-si (KR)

( * ) Notice: Subject to any disclaimer, the term of this patent is extended or adjusted under 35 U.S.C. 154(b) by 0 days.

(21) Appl. No.: 16/500,406

(22) PCT Filed: Apr. 4, 2018

(86) PCT No.: PCT/KR2018/003987
§ 371 (c)(1),
(2) Date: Oct. 3, 2019

(87) PCT Pub. No.: WO2018/186684
PCT Pub. Date: Oct. 11, 2018

(65) Prior Publication Data
US 2020/0189156 A1    Jun. 18, 2020

(30) Foreign Application Priority Data

Apr. 4, 2017  (KR) .................. 10-2017-0043568
May 23, 2017 (KR) .................. 10-2017-0063539
Jun. 21, 2017 (KR) .................. 10-2017-0078748

(51) Int. Cl.
*H01B 13/06* (2006.01)
*B29C 45/14* (2006.01)
(Continued)

(52) U.S. Cl.
CPC .. *B29C 45/14336* (2013.01); *B29C 45/14065* (2013.01); *B29C 45/14639* (2013.01);
(Continued)

(58) Field of Classification Search
CPC ........ B29C 45/14336; B29C 45/14065; B29C 45/14639; B29C 45/14122; H01B 7/0009;
(Continued)

(56) References Cited

U.S. PATENT DOCUMENTS 6,168,470 B1 * 1/2001 Ikeda .................... H01M 2/206
439/620.08
8,721,368 B2 * 5/2014 Zhao ..................... H01M 2/305
439/627
(Continued)

FOREIGN PATENT DOCUMENTS

GB      2330253 A       4/1999
JP      2009-219320 A   9/2009
(Continued)

OTHER PUBLICATIONS

International Search Report dated Aug. 23, 2018 for PCT/KR2018/003987, and its English translation.
(Continued)

*Primary Examiner* — Timothy J Thompson
*Assistant Examiner* — Michael F McAllister (57) ABSTRACT

According to an embodiment of the present disclosure, provided is a method for manufacturing a bus bar in which a frame including a sensing part and a body part connected to the sensing part is prepared, the frame is inserted into and fixed to an injection molding mold, and an enhanced part enhancing the strength at a position where fatigue is concentrated by an enhancing injection material injected into the injection molding mold is formed in the frame.

17 Claims, 7 Drawing Sheets

(51) Int. Cl.
*H01B 7/00* (2006.01)
*H01M 2/20* (2006.01)
*B29L 31/34* (2006.01)

(52) U.S. Cl.
CPC ........... *H01B 7/0009* (2013.01); *H01B 13/06* (2013.01); *H01M 2/206* (2013.01); *B29C 2045/14122* (2013.01); *B29L 2031/3468* (2013.01); *H01M 2220/20* (2013.01)

(58) Field of Classification Search
CPC .. H01B 13/06; H01M 2/206; H01M 2220/20; B29L 2031/3468; H02B 1/20; H02B 1/207; H02G 5/00; H02G 5/007
USPC ........................................................ 174/110 R
See application file for complete search history.

(56) References Cited

U.S. PATENT DOCUMENTS

| | | | | |
|---|---|---|---|---|
| 9,136,039 | B2 * | 9/2015 | Diez | H01M 10/0525 |
| 10,381,815 | B2 * | 8/2019 | Shoji | H01M 10/48 |
| 10,497,919 | B2 * | 12/2019 | Fees | H01M 2/30 |
| 2006/0270277 | A1 * | 11/2006 | Zhao | H01R 43/16 |
| | | | | 439/627 |
| 2009/0274956 | A1 * | 11/2009 | Kosugi | H01M 2/202 |
| | | | | 429/158 |
| 2011/0097618 | A1 * | 4/2011 | Hauck | H01M 10/425 |
| | | | | 429/158 |
| 2012/0276431 | A1 * | 11/2012 | Groshert | H01M 2/206 |
| | | | | 429/99 |
| 2015/0079453 | A1 * | 3/2015 | Choi | H01M 2/204 |
| | | | | 429/158 |
| 2015/0140393 | A1 * | 5/2015 | Yamamoto | H01R 11/288 |
| | | | | 429/121 |
| 2015/0171405 | A1 * | 6/2015 | Lee | H01M 2/206 |
| | | | | 429/89 |
| 2015/0188100 | A1 * | 7/2015 | Isozaki | H01M 2/08 |
| | | | | 429/181 |
| 2016/0093862 | A1 | 3/2016 | DeKeuster et al. | |
| 2016/0308187 | A1 * | 10/2016 | Subramanian | H01M 2/305 |
| 2018/0151862 | A1 * | 5/2018 | Bessho | H01M 2/1077 |
| 2018/0166840 | A1 * | 6/2018 | Okazaki | H01M 10/48 |
| 2019/0273239 | A1 * | 9/2019 | Sato | H01M 2/10 |
| 2019/0348720 | A1 * | 11/2019 | Oh | H01M 2/22 |
| 2019/0385767 | A1 * | 12/2019 | Takahashi | H01B 13/06 |

FOREIGN PATENT DOCUMENTS

| | | |
|---|---|---|
| JP | 2012-182047 A | 9/2012 |
| JP | 2013-102596 A | 5/2013 |
| JP | 2014-065176 A | 4/2014 |
| JP | 2016-096637 A | 5/2016 |
| JP | 2017-004873 A | 1/2017 |
| KR | 20-0406435 Y1 | 1/2006 |
| KR | 10-2009-0129201 A | 12/2009 |
| KR | 10-2010-0115947 A | 10/2010 |
| KR | 10-2011-0045127 A | 5/2011 |
| KR | 10-1209892 B1 | 12/2012 |
| KR | 10-2014-0146232 A | 12/2014 |
| KR | 10-1538441 B1 | 7/2015 |
| KR | 10-1609375 B1 | 4/2016 |
| KR | 20-2016-0001383 U | 4/2016 |

OTHER PUBLICATIONS

Publication No. 10-2090619 published on Mar. 19, 2020 for Korean Application No. 10-2017-0063539.
Supplementary European Search Report dated Oct. 13, 2020 for European Application No. 18780821.

* cited by examiner

METHOD FOR MANUFACTURING BUSBAR AND MANUFACTURING BUSBAR THROUGH THE SAME

CROSS-REFERENCE TO RELATED APPLICATIONS

This application is a national phase entry of International Application No. PCT/KR2018/003987, filed on Apr. 4, 2018, which claims the benefit of and priority to Korean Patent Application Nos. 10-2017-0043568, filed on Apr. 4, 2017; 10-2017-0063539, filed on May 23, 2017; and 10-2017-0078748, filed on Jun. 21, 2017, the content of which are herein incorporated by reference in their entirety.

TECHNICAL FIELD

The present disclosure relates to a method for manufacturing a bus bar and the bus bar manufactured by the same.

BACKGROUND ART

In general, as a method for manufacturing a bus bar, there are a method for manufacturing a bus bar by manufacturing a body part and a sensing part separately and bonding them to each other and a method for manufacturing the bus bar by integrating them. Among them, the method for manufacturing the bus bar by manufacturing the sensing part and the body part separately and bonding them by welding or the like additionally requires a manufacturing process of bonding, and causes an increase in the manufacturing process and the cost due to degradation of durability of a bonded part and the degradation of durability of the bonded part. On the other hand, in order to solve this problem, the method for manufacturing the bus bar by integrating them may omit the bonding process, and may not occur the breakage of the degradation of durability at the bonded part. However, relaxation and contraction may occur due to an impact applied to the bus bar, and the relaxation and the contraction may cause a short circuit between the sensing part and the body part.

RELATED ART DOCUMENT

Patent Document

[Patent Document 1] Korean Patent Laid-Open Publication No. 10-2014-0146232 (Dec. 24, 2014)

DISCLOSURE

Technical Problem

In order to solve a problem due to a short circuit of a connection part caused by relaxation and contraction of a body part and a sensing part by the conventional bus bar for an electric vehicle using an integrated bus bar of the body part and the sensing part, an object of an embodiment of the present disclosure is to provide a method for manufacturing an integrated bus bar of a body part and a sensing part and then manufacturing it so that the body part and the sensing part of the bus bar are positioned in the thickness of an injection-molded product by performing a primary or primary and secondary insert injection molding for the integrated bus bar, and a method for manufacturing a bus bar that secures durability of the bus bar by injection-molding only the sensing part.

In order to solve a problem due to a short circuit of a connection part caused by relaxation and contraction of a body part and a sensing part by the conventional bus bar for an electric vehicle using an integrated bus bar of the body part and the sensing part, another object of an embodiment of the present disclosure is to provide a method for manufacturing an integrated bus bar of a body part and a sensing part and then manufacturing it so that the body part and the sensing part of the bus bar are positioned in the thickness of an injection-molded product by performing a primary or primary and secondary insert injection molding for the integrated bus bar, and a bus bar that secures durability of the bus bar by injection-molding only the sensing part.

In order to solve a problem that may cause degradation of the price competitiveness and a quality problem due to the difficulty in confirming the presence or absence of the bonding due to many manufacturing processes in the process of manufacturing a body part and a sensing part with a heterogeneous material, respectively to bond them through ultrasonic, laser, or the like, still another object of an embodiment of the present disclosure is to provide a method for manufacturing an integrated bus bar of a body part and a sensing part and then manufacturing it so that the body part and the sensing part of the bus bar are positioned in the thickness of an injection-molded product by performing a primary or primary and secondary insert injection molding for the integrated bus bar, and a method for manufacturing a bus bar that secures durability of the bus bar by injection-molding only the sensing part.

In order to solve a problem that may cause degradation of the price competitiveness and a quality problem due to the difficulty in confirming the presence or absence of the bonding due to many manufacturing processes in the process of manufacturing a body part and a sensing part with a heterogeneous material, respectively to bond them through ultrasonic, laser, or the like, still another object of an embodiment of the present disclosure is to provide a method for manufacturing an integrated bus bar of a body part and a sensing part and then manufacturing it so that the body part and the sensing part of the bus bar are positioned in the thickness of an injection-molded product by performing a primary or primary and secondary insert injection molding for the integrated bus bar, and a bus bar that secures durability of the bus bar by injection-molding only the sensing part.

Technical Solution

According to an embodiment of the present disclosure, provided is a method for manufacturing a bus bar in which a frame including a sensing part and a body part connected to the sensing part is prepared, the frame is inserted into and fixed to an injection molding mold, and an enhanced part is formed in the frame in order to improve the degree of one or more of the strength and the insulation at one or more positions of a position where fatigue is concentrated and a position capable of electrical conduction by an enhancing injection material injected into the injection molding mold.

Further, the insertion and the fixing may be performed by a protrusion in the injection molding mold, and the protrusion may be introduced into the injection molding mold by the supply pressure of the enhancing injection material.

Further, the enhancing injection material may be injected into the injection molding mold once to form the enhanced part in the frame.

Further, the fatigue may occur in a direction in which the frame is repeatedly bent.

Further, the fatigue may occur at one or more positions of the body part and the sensing part.

Further, the frame may further include a connection part connecting between the sensing part and the body part.

Further, the fatigue may occur at one or more positions of the body part, the sensing part, and the connection part.

The enhancing injection material may include a primary enhancing injection material and a secondary enhancing injection material injected sequentially, and one surface of the frame may be enhanced through a primary injection molding by injecting the primary enhancing injection material therein, and the other surface of the frame may be enhanced through a secondary injection molding by injecting the secondary enhancing injection material therein.

Further, the fatigue may occur in a direction in which the frame is repeatedly bent.

Further, the fatigue may occur at one or more positions of the body part and the sensing part.

Further, the frame may further include a connection part connecting between the sensing part and the body part.

Further, the fatigue may occur at one or more positions of the body part, the sensing part, and the connection part.

Further, a nonferrous metal may be aluminum or copper.

Further, the frame may further include a connection part connecting between the sensing part and the body part, and one or more of the primary injection molding and the secondary injection molding may be performed on the connection part.

Further, the frame may further include a connection part connecting between the sensing part and the body part, and the connection part may be prepared to have elasticity.

Further, elasticity may be provided by a curved part prepared on the connection part.

Further, the connection part may be surface-treated by one or more among nickel, tin, gold, silver, and zinc.

Further, the body part may include a through hole to enhance a heat dissipation property and a low resistance property.

Further, the through hole may be a rectangular or circular hole.

Further, the frame may be adhered to an upper mold by a protrusion formed in the injection molding mold so that an insert position is fixed during the primary injection molding and the secondary injection molding.

Further, the frame may include an irregularity part enhancing the adhesion with the primary enhancing injection material and the secondary enhancing injection material.

Further, the irregularity part may include at least one among a hole, a spike, and a drawing, and may be formed on one or more contact surfaces of the frame and the primary enhancing injection material or the secondary enhancing injection material.

Further, the primary enhancing injection material and the secondary enhancing injection material may be different materials from each other.

Further, one or more of the primary enhancing injection material and the secondary enhancing injection material may include resin.

Further, at least partial portion in which a wire may be coupled to the body part may be blocked from being injected by the primary enhancing injection material and the secondary enhancing injection material, respectively, during the primary injection molding and the secondary injection molding.

Further, the frame may include a carrier configured to fix the frame to the injection molding mold during the primary injection molding and the secondary injection molding.

Further, the frame may be manufactured in a state where the frame and a guide have been connected, and the guide and the frame may be connected by a notch to separate the frame and the guide with respect to the notch after the secondary injection molding.

Further, the sensing part may be plated by one among gold, silver, nickel, tin, and zinc.

Provided is a bus bar including a sensing part, a body part connected to the sensing part, and an enhanced part enhancing one or more of the strength and the insulation of the body part, and the enhanced part is formed at one side of the body part, and the enhanced part is made of one or more materials.

Further, the bus bar may further include a connection part connecting between the sensing part and the body part.

Provided is a bus bar including a sensing part, a connection part having one side coupled to the sensing part, a body part coupled to the other side of the connection part, and an enhanced part formed at one side in the body part and the connection part, and enhancing one or more of the strength and the insulation at one or more positions of the connection part and the body part.

Further, the enhanced part may include a primary enhancing injection material and a secondary enhancing injection material, and one or more of the primary enhancing injection material and the secondary enhancing injection material may be resin.

Provided is a bus bar including a sensing part, a connection part having one side coupled to the sensing part, a body part coupled to the other side of the connection part, and an enhanced part enhancing one or more of the strength and the insulation in the connection part and the body part, and the body part is prepared in plural and stacked on each other, and the enhanced part is formed on a portion of an exposed surface in a state where the body part has been stacked on each other.

Advantageous Effects

An embodiment of the present disclosure may provide the bus bar, which may secure the thickness and tensile strength of the body and secure the elastic force of the sensing part, thereby preventing the short circuit of the connection part due to relaxation and contraction.

An embodiment of the present disclosure may provide a method for manufacturing the bus bar, which may not separate the manufacturing process, thereby preventing degradation of the price competitiveness.

BEST MODE

Hereinafter, a specific embodiment of the present disclosure will be described with reference to the accompanying drawings. However, this is merely for illustrative and the present disclosure is not limited thereto.

In the following description of the present disclosure, if it is determined that a specific description of the known technology related to the present disclosure unnecessarily obscures the gist of the present disclosure, a detailed description thereof will be omitted. Further, terms to be described later are terms defined considering the function in the present disclosure, which may be changed according to the intent, custom, or the like of a user or an operator. Accordingly, its definition should be made based on the contents throughout the present specification.

The technical spirit of the present disclosure is determined by the claims, and the following embodiment is merely a means for efficiently explaining the technical spirit of the present disclosure to those skilled in the art to which the present disclosure pertains.

Further, hereinafter, a method for enhancing a frame (10 in FIG. 2) and a bus bar (20 in FIG. 3A) manufactured by the method will be described later. Here, the enhancement may be a purpose of enhancing the strength against an external impact to be applied to the frame (10 in FIG. 2) and a purpose of adding, maintaining, and enhancing the insulation from the outside. For example, if the manufactured bus bar (20 in FIG. 3A) is connected with a battery of a vehicle, the bus bar 20 may be affected by the vibration generated during driving of the vehicle. At this time, the bending, or the like may be affected by the vibration and pressure delivered from a surrounding structure, and here, it may be said to be a kind of enhancing process of enhancing the resistance of the bending. Accordingly, the most vulnerable point due to the bending may be formed as an enhanced part in the manufacturing process in order to enhance the strength from the bending that causes fatigue. A position of the enhanced part may be one or more positions of the body parts (420, 520, 620 in FIG. 5A, FIG. 5B, and FIG. 5C) and the sensing parts (410, 510, 610 in FIG. 5A, FIG. 5B, and FIG. 5C), and may be formed on a connection part (112 in FIG. 2) if the frame (10 in FIG. 2) includes the connection part (112 in FIG. 2). For example, the enhanced part may also be formed on the connection part that is formed to be relatively narrow in width and vulnerable to the bending. Of course, a curved part (113 in FIG. 2) may be formed on the connection part (112 in FIG. 2) and may also be structurally formed to have the elasticity at the point where the bending is applied.

Further, for the purpose of adding, maintaining, and enhancing the insulation from the outside, it is possible to serve as a coating. That is, it is possible to conceal an area exposed from the outside, thereby preventing an electrical accident such as a short that may be caused by the inevitable contact with the surrounding structure. It is possible to prevent the electrical accident caused by the contact with the moisture as well as the surrounding structure in advance. Accordingly, it is possible to inject a material capable of suppressing the electrical conductivity during the injection without injecting an enhancing injection material that may serve as a conductor after the curing during the injection. For example, it is possible to inject the enhancing injection material containing a resin material during the injection, thereby adding, maintaining, and enhancing the insulation.

Hereinafter, an embodiment in which an enhancing injection process is performed in plural times and an embodiment in which an enhancing injection process is performed once in order to form the enhanced part will be described later. An embodiment in which primary and secondary injection moldings are performed will be described with reference to FIGS. 1 to 6, and a process of forming the enhanced part through a one-time injection molding process will be described with reference to FIG. 7. Further, when the description is made with reference to FIG. 7, different points therebetween will be mainly described in comparison with the contents described with reference to FIGS. 1 to 6.

Figure 1:
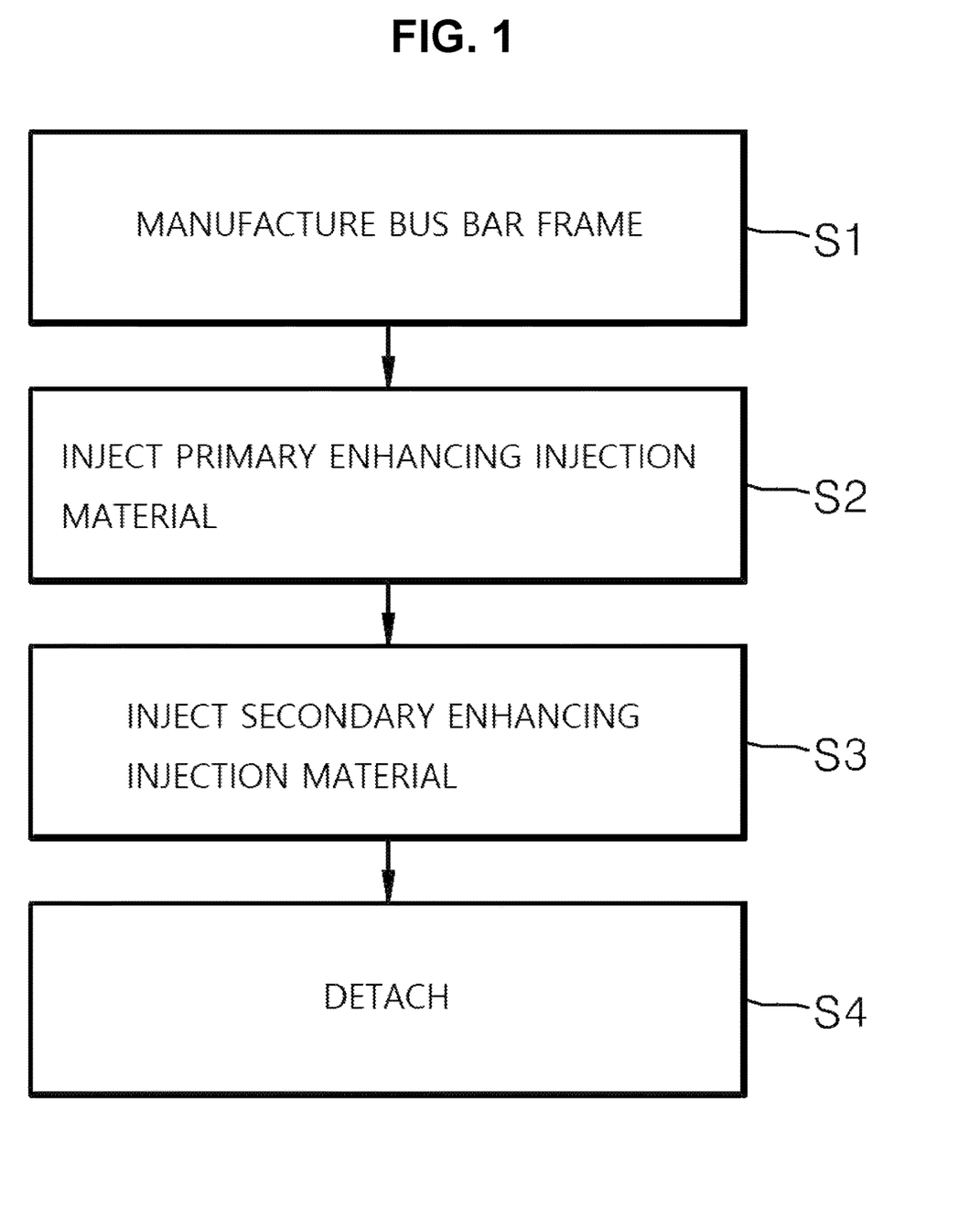
FIG. 1 is a flowchart illustrating a process of manufacturing a bus bar according to an embodiment of the present disclosure.

FIG. 1 is a flowchart illustrating a process of manufacturing the bus bar (20 in FIG. 2) according to an embodiment of the present disclosure.

Referring to FIG. 1, the bus bar (20 in FIG. 2) may be manufactured in the order of manufacturing a frame (operation S1), injecting a primary enhancing injection material (operation S2), injecting a secondary enhancing injection material (operation S3), and detaching (operation S4). Specifically, the manufacturing the frame (operation S1) may manufacture the frame (10 in FIG. 2) including a sensing part (110 in FIG. 2) and a body part (120 in FIG. 2). The frame (10 in FIG. 2) manufactured by a method such as a press may be manufactured as the bus bar (20 in FIG. 3A) while being coupled through the enhancing injection material and the injection. The frame (10 in FIG. 2) may be manufactured by including shapes of a curved part 113, a sensing hole 111a, and the like in the sensing part (110 in FIG. 2) and shapes of a curved part 123, a hollow hole 121a, and the like in the body part 120. That is, a shape that is the base of the bus bar (20 in FIG. 3A) may be prepared. Here, the sensing part 110 and the body part 120 may be integrally formed, and do not include a separate bonding process. Accordingly, it is possible to prevent degradation of the durability due to the coupling structure.

That is, it is possible to enhance the mechanical performance by being manufactured integrally. Here, the mechanical performance may mean performance of maintaining a coupling force against the vibration, or the like, performance capable of resisting against the breakage that may occur from an external force, or the like. Such performance may be advantageous because of having a higher resistance than that of the bus bar manufactured by the coupling between two members against the vibration of the vehicle, or the like if the bus bar (20 in FIG. 3A) of an embodiment of the present disclosure is included for example, in a component of the vehicle, or the like. Of course, as described above, it is also possible to expect the enhancement in the insulation. Since the effect that may be expected from the enhanced part is optional, the enhancing injection material may be determined as a metal material when the rigidity is prioritized to the insulation by those skilled in the art, and determined as a material such as a resin material when the insulation is prioritized to the rigidity. Accordingly, a material of the enhancing injection material is optional, and it is possible to adjust the specific gravity of the insulation and the rigidity by fusing a plurality of materials. Furthermore, it is also possible to provide the elasticity to the enhanced part.

Further, the frame manufactured in the manufacturing frame (operation S1) may be, for example, 5 mm. The 5 mm is an example of the thickness corresponding to 50% of the thickness of the bus bar manufactured without undergoing the process of being enhanced through the injection, and the present disclosure is not limited to 5 mm. Hereinafter, a process of manufacturing a bus bar will be described by taking the frame manufactured to the thickness of 5 mm as an example.

The frame (10 in FIG. 2) manufactured through the manufacturing the frame (operation S1) may enhance a portion having a weak durability, that is, a portion where a stress may be concentrated by an external force. For example, an enhancing injection material may be injected for the purpose of enhancing the frame (10 in FIG. 2). Accordingly, in order to inject it by injecting the enhancing injection material, the frame (10 in FIG. 2) may be disposed in a primary injection molding mold and the injecting the primary enhancing injection material (operation S2) may be performed. The primary enhancing injection material may be injected, for example, into one surface of the frame (10 in FIG. 2). Here, one surface of the frame (10 in FIG. 2) may be the bottom surface of the frame (10 in FIG. 2), and may be a portion of the bottom surface or the entire bottom surface.

Further, thereafter, the mold may be rearranged to perform the injecting the secondary enhancing injection material (operation S3). If the enhancing injection material has been injected into the bottom surface in the injecting the primary enhancing injection material (operation S2), only an upper mold may be rearranged and the secondary enhancing injection material may be injected therein. In this case, the secondary enhancing injection material may be injected (operation S3) into the other surface of the frame (10 in FIG. 2). Here, the other surface may be the upper surface of the frame (10 in FIG. 2), and may be a portion of the upper surface or the entire upper surface.

However, in the injecting the primary enhancing injection material (operation S2) and the injecting the secondary enhancing injection material (operation S3), the sensing part (110 in FIG. 2), as a terminal capable of the electrical conduction, may be blocked from the injection of the enhancing injection material. Accordingly, the sensing part (110 in FIG. 2) may be exposed even after being manufactured as the bus bar (20 in FIG. 3A). Here, the frame (10 in FIG. 2) may be made of a nonferrous metal, for example, aluminum or copper. Further, the enhancing injection materials injected primarily and secondarily may contain at least resin. Accordingly, if the enhancing injection material is not blocked for the sensing part (110 in FIG. 2), the electrical conduction through the sensing part (110 in FIG. 2) may be impossible, such that the enhancing injection material may be blocked. Furthermore, the sensing part (110 in FIG. 2) may be plated with one material of gold, silver, nickel, tin, and zinc.

Meanwhile, in the mold disposed for injecting the primary enhancing injection material and the secondary enhancing injection material, the frame (10 in FIG. 2) has been fixed in the mold and then the enhancing injection material may be injected (operations S2, S3), and a fixing means may be formed to prevent the frame (10 in FIG. 2) from being moved in the mold by the injected enhancing injection material.

One or more of a hole, a spike, and a drawing may be formed in the frame, formed on the contact surfaces where the primary enhancing injection material, the secondary enhancing injection material, and the frame (10 in FIG. 2) may contact each other, and formed on one or more contact surfaces among the contact surfaces, thereby enhancing the adhesion between the frame (10 in FIG. 2) and one or more of the primary enhancing injection material and the secondary enhancing injection material.

Meanwhile, the injected enhancing injection material may be fixed to the frame (10 in FIG. 2) to enhance a low durability portion of the frame (10 in FIG. 2). Further, this enhancing injection material may be injected for the purpose of enhancing the durability, but may also be injected to form a heat dissipation surface. For example, if one surface of the body part 120 has been disposed in the mold to be injected into only some areas when being injected by the enhancing injection material, an area where the enhancing injection material is not supplied may be exposed to the outside. Since the exposed surface is exposed even after the bus bar (20 in FIG. 3A) has been manufactured, it may be a surface where the heat generated during the flow of the current may be dissipated. For example, the heat dissipating surface is one surface of the body part 120, and as the exposed area is wider, the heat dissipation is better.

Figure 4A:
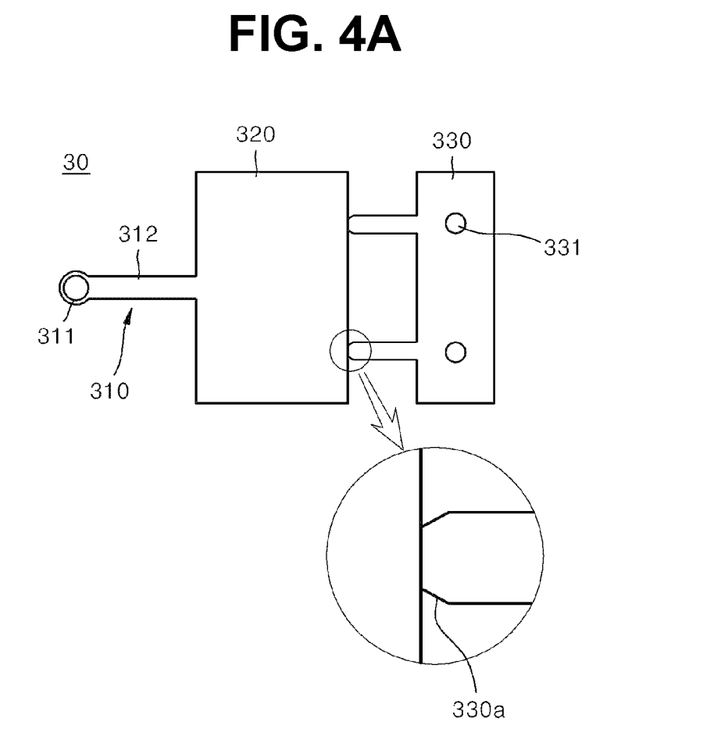
FIG. 4A is a perspective diagram of a frame according to another embodiment of the present disclosure.

Subsequently, the detaching the mold (operation S4) may separate it from a guide (330 in FIG. 4) in the case of manufacturing by further including the guide (330 in FIG. 4) in the frame (10 in FIG. 2) in the injecting the enhancing injection materials (operations S2, S3). This will be described later in detail with reference to FIG. 4.

Figure 2:
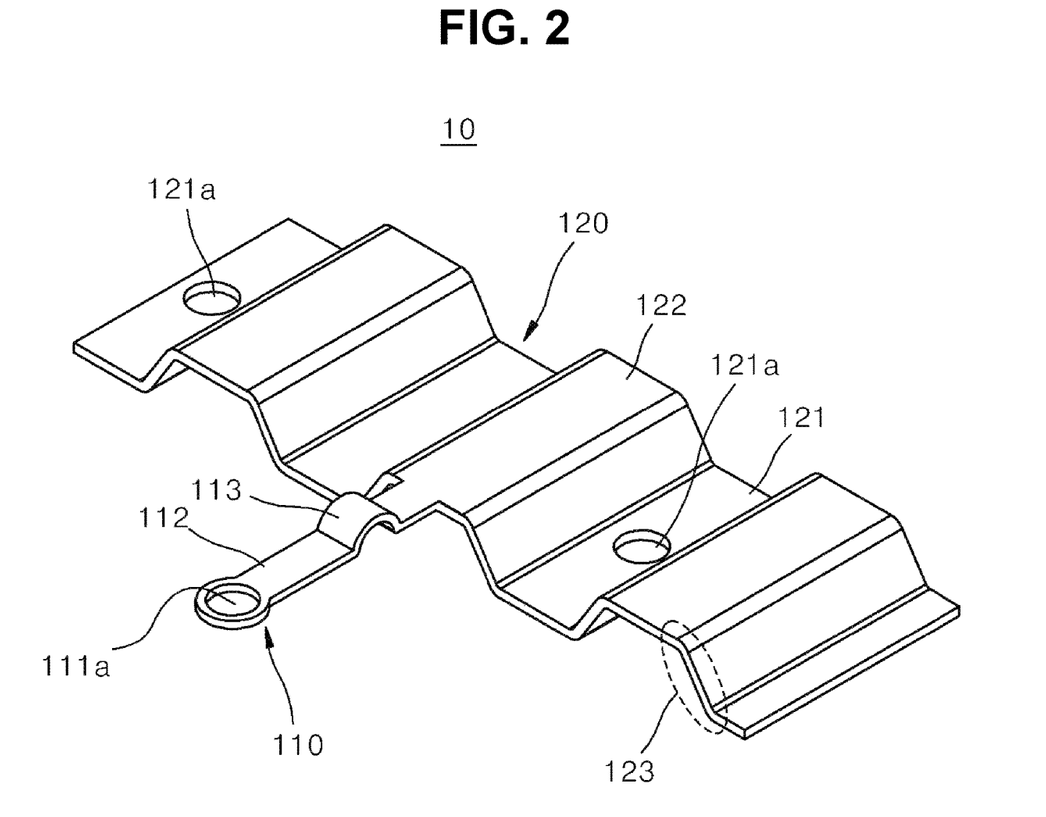
FIG. 2 is a perspective diagram of a frame according to an embodiment of the present disclosure.

FIG. 2 is a perspective diagram of the frame 10 according to an embodiment of the present disclosure.

Referring to FIG. 2, the frame 10 may include the sensing part 110 and the body part 120. Here, the sensing part 110 may have the sensing hole 111a for connecting with the terminal formed therein, and may be connected with the body part 120 through the connection part 112 according to the spacing distance with the terminal. That is, the sensing part 110 is connected with one side of the connection part 112 and the other side of the connection part 112 is connected with the body part 120, such that the sensing part 110 and the body part 120 may be electrically connected. In this embodiment, the curved part 113 may be formed on the connection part 112 to structurally provide the elasticity to the frame 10. As described above, if the curved part 113 is included in a component of the vehicle, the curved part 113 may be a structure in which the vibration may be generated by the vehicle during driving and the resistance against the above may be enhanced. The curved part 113 may also be formed in the body part 120. The curved part 123 of the body part 120 may also be the same reason as described above.

As described above, the thickness of the frame 10 may be 0.5 mm. This thickness may be made thicker by forming enhanced parts (213a, 220a in FIG. 3A and FIG. 3B), and accordingly, may be determined considering the thickness of the enhanced part when manufacturing the frame 10. That is, if the enhanced parts (213a, 220a in FIG. 3A and FIG. 3B) are not formed or are formed only on one side thereof, the thickness of the frame 10 may be determined to be 1 mm to 1.5 mm during the manufacturing thereof.

Meanwhile, the body part 120 may have a valley 121 and a ridge 122 by the curved part 123. A hollow hole 121a may be formed in a portion of the valley 121, the ridge 122, and the curved part 123. The illustrated example is an example in which the hollow hole 121a has been formed in the valley 121, but may be formed even in the ridge, and it is possible to expect the effects such as the heat dissipation and electrical low resistance property through the hollow hole 121a.

In particular, regarding the heat dissipation, the exposed area in the air of the body part 120 may be increased by the curved part 123, thereby further increasing the heat dissipation effect. Of course, this effect may also correspond to the curved part 113 formed on the connection part 112.

Further, heat may be dissipated through the exposed surface if the surface exposed to the outside is formed even after a primary enhancing injection material (222a in FIG. 3B) and a secondary enhancing injection material (223a in FIG. 3B) have been positioned in the frame 10.

Figure 3A:
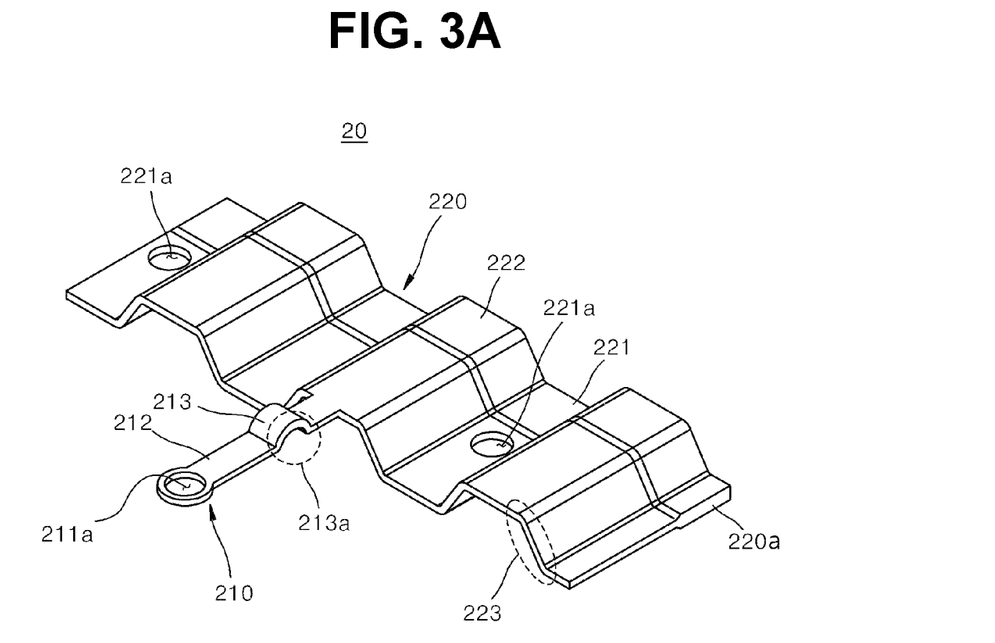
FIG. 3A and FIG. 3B are perspective diagrams of a bus bar according to embodiments of the present disclosure.
Figure 3B:
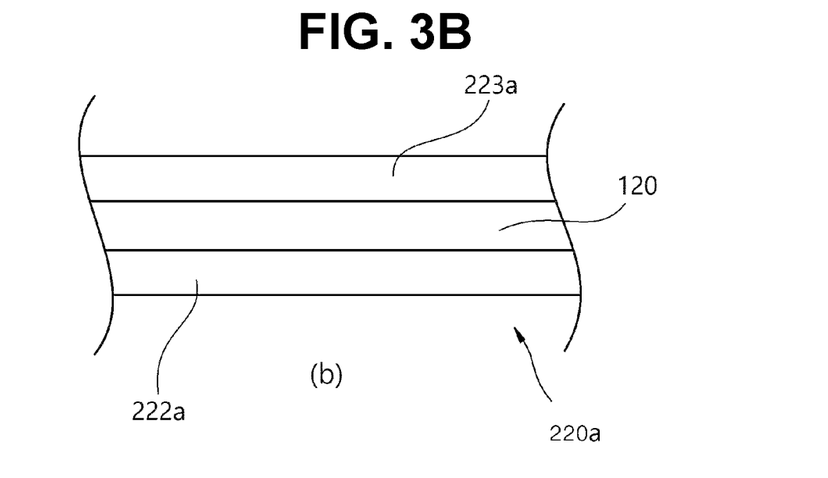

Referring to FIGS. 3A and 3B, as the bus bar 20 manufactured by supplying the enhancing injection materials 222a, 223a to the frame 10 in FIG. 2, the bus bar 20 may further include enhanced parts 213a, 220a in the frame 10. By forming the enhanced parts 213a, 220a, the thickness of the bus bar 20 may be increased overall or locally. This example is an example in which the enhancing injection materials 222a, 223a have been injected into the curved part 213 and a portion of the body part 220, and the current passing cross-sectional areas of the body part 220 and the curved part 213 are increased by the enhancing injection materials 222a, 223a, thereby reducing the electrical resistance to enhance the electrical conductivity and to enhance the durability by the vibration.

As described above, since the enhanced parts 213a, 221a may be selectively formed by a primary injection molding and a secondary injection molding, for example, the enhancing injection materials 222a, 223a may be injected into the curved part 213 to form the enhanced part 213a, and the enhanced part 220a may be formed on one end of the body part 120, which may be connected with a separate member. As described above, since the enhanced parts 213a, 220a may be selectively formed by the primary injection molding and the secondary injection molding, the enhanced part may be formed even in any portion not described in this example as many as possible.

Meanwhile, the enhanced parts 213a, 220a may be enhanced twice on the bottom surface and the top surface of the frame 10. If the primary enhancing injection material 222a is injected into the bottom surface of the body part 120 of the frame 10 to be coupled with the frame 10, the secondary enhancing injection material 223a is injected into the top surface of the body part 120 to be coupled with the frame 10. As described above, the thickness of the bus bar at this time may be 1 mm to 1.5 mm. Further, the primary enhancing injection material 222a and the secondary enhancing injection material 223a may be different materials from each other, and at least one material may be resin.

Figure 4B:
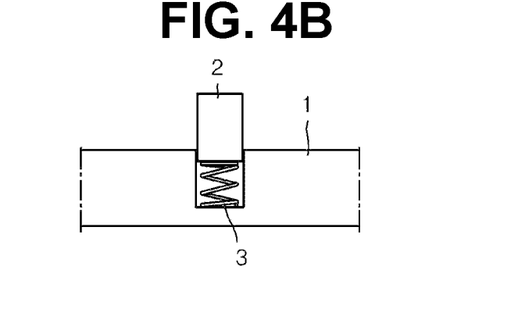
FIG. 4B is a diagram of a protrusion formed in a mold according to an embodiment of the present disclosure.

FIG. 4 is a diagram illustrating the frame 30 and a partial structure of the mold 1 according to another embodiment of the present disclosure; and FIG. 4A is a perspective diagram of the frame 30 according to another embodiment of the present disclosure and FIG. 4B is a perspective diagram of a protrusion 2 formed in the mold according to an embodiment of the present disclosure.

Referring to FIG. 4A, the frame 30 may further include the guide 330 in the frame 10 described above. The guide 330 is a structure for fixing the frame 30 not to be moved when the enhancing injection material is supplied in the mold 1 during the primary injection molding and the secondary injection molding, and may be positioned in the mold 1 during the primary injection molding and the secondary injection molding. For example, the guide 330 may allow a portion of the frame 30 positioned inside the mold 1 to be fixed without being moved.

The frame 30 having a structure integrally formed with the guide 330 may be connected by a notch 330a in the mold. The notch 330a may separate the guide 330 from the frame 30 by a method such as the cutting after the secondary injection molding. That is, the notch 330a may allow the frame 30 to be fixed without being moved in the mold 1, and when the secondary injection molding is completed, the connection area is preferably formed to be small so that the guide 330 is easily separated.

Further, a pinhole 331 may be formed in the guide 330 for the fixing. The guide 331 may be fixed to fix the frame 30 and the pinhole 331 may be coupled with and fixed to a pin formed in the mold. Accordingly, two pinholes 331 may be formed. Of course, it is a structure for the fixing, which is limited to a circular case, and in the case of a prismatic hole such as a square, one or more holes may also be formed.

Referring to FIG. 4B, as another fixing method of the frame 10 in the mold 1, the protrusion 2 is formed in the mold 1, and a groove corresponding to the protrusion 2 may be formed in the frame 10. The protrusion 2 is a structure for pressing the frame 10, and although the protrusion 2 is not formed to correspond to the groove, the protrusion 2 may contact the surface of the frame 10 to support the frame 10. As one embodiment, the protrusion 2 may be protruded from the mold 1, and may be disposed with the mold 1 with an elastic body 3 interposed therebetween. That is, in order to fix the frame 10, the protrusion 2 may press the frame 10 by the elastic body 3 in a direction protruding from the mold 1.

Figure 5A:
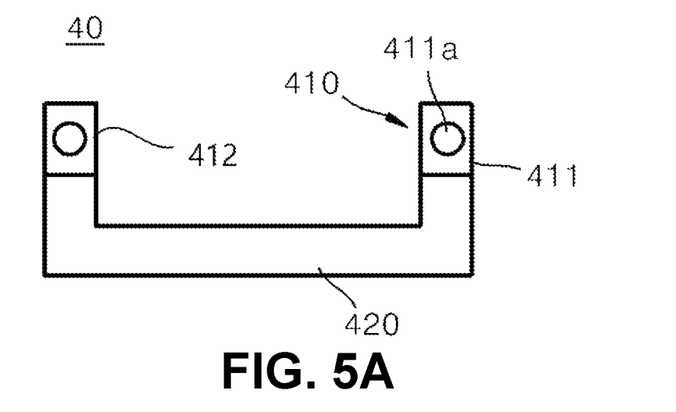
FIGS. 5A, 5B, and 5C are diagrams illustrating a shape of a bus bar according to other embodiments of the present disclosure.
Figure 5B:
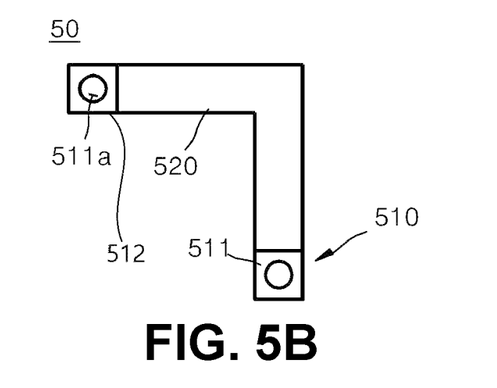
Figure 5C:
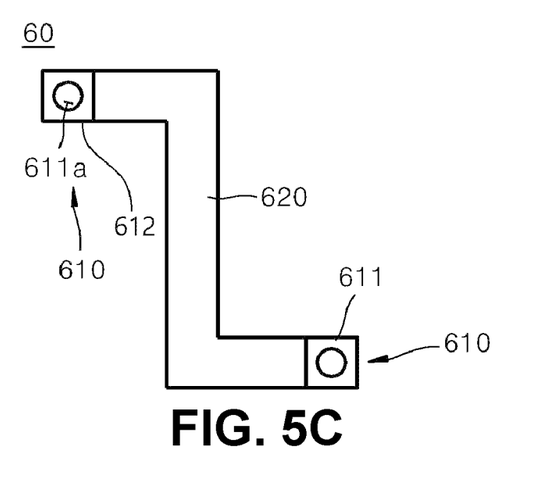

FIGS. 5A, 5B, and 5C are diagrams illustrating bus bars 40, 50, 60 according to other embodiments of the present disclosure. Specifically, FIG. 5A is a diagram illustrating the bus bar 40 of a "⌐" shape, FIG. 5B is a diagram illustrating the bus bar 50 of a "¬" shape, and FIG. 5C is a diagram illustrating the bus bar 60 of a "Z" shape. This example is intended to disclose various examples in terms of shapes of the bus bars 40, 50, 60.

Figure 6:
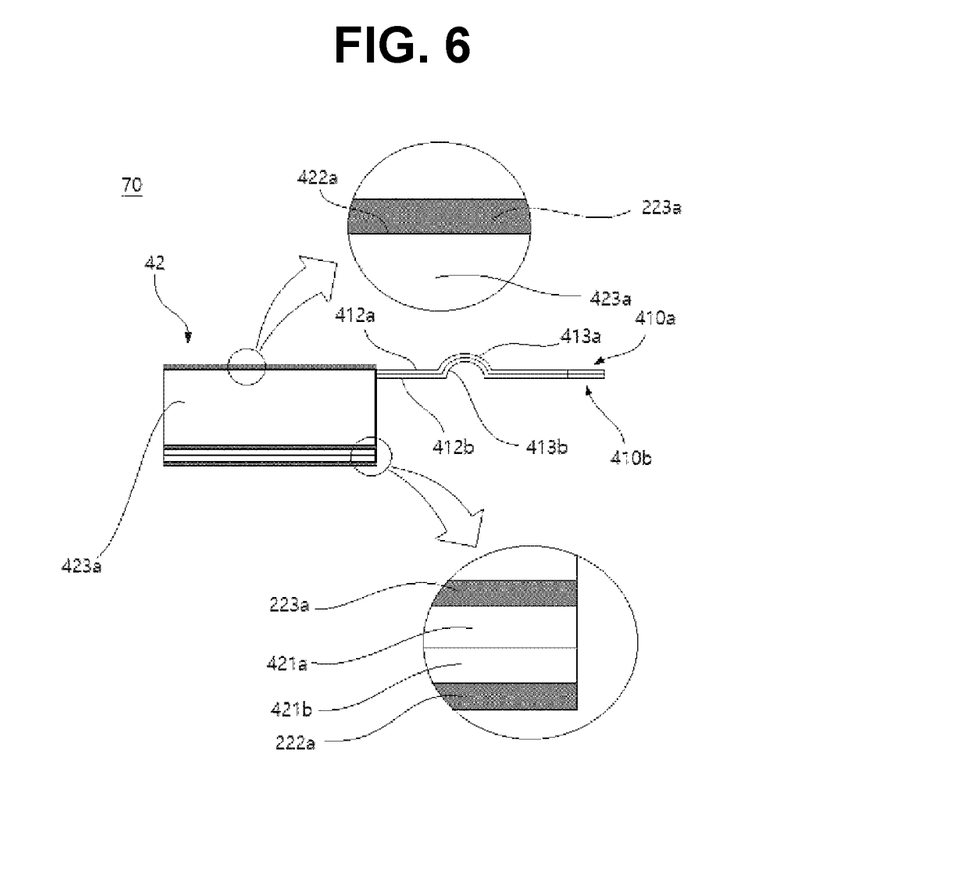
FIG. 6 is a diagram illustrating a shape of a stacked bus bar according to another embodiment of the present disclosure.

Referring to FIG. 6, as an example in which the bus bars 40, 50, 60 have sensing parts 410, 510, 610 positioned on both ends thereof, respectively, and have body parts 420, 520, 620 positioned between the respective sensing parts 410, 510, 610, the bending of the body parts 420, 520, 620 may be formed variously.

Furthermore, here, the bus bars 20, 40, 50, 60 manufactured by the insert injection may be made of a nonferrous metal, and for example, the nonferrous metal may be aluminum, copper, or the like. Further, the manufactured bus bars 20, 40, 50, 60 may be formed so that the thicknesses of the body part 200 and the connection part 100 become different by the enhanced parts (213a, 221a in FIG. 3A) through the enhancement by the enhancing injection materials 222a, 223a. The elasticity may be determined by the difference.

Further, the bus bars 20, 40, 50, 60, in which the injecting the primary enhancing injection material (operation S2) and the injecting the secondary enhancing injection material (operation S3) have been performed in the frame 10 by the enhancing injection materials 222a, 223a, may have the sensing parts 210, 410, 510, 610 surface-treated by nickel, tin, or the like. In addition to the surface treatment, the sensing parts 210, 410, 510, 610 may be configured by forming a plating layer including at least any one of nickel, gold, copper, and tin.

Further, in order to enhance the adhesion by the enhancing injection materials 222a, 223a injected during the primary injection molding and the secondary injection molding, the frames 10, 30 may have an irregularity part formed on the outer surface contacting the frame 1. The irregularity part is non-uniform and rough, includes a protrusion or uneven shape, and includes one or more of a hole, a spike, and a drawing. The enhancing injection materials 222a, 223a may be injected into the irregularity part side to further increase the coupling force between the frames 10, 30 and the enhancing injection materials 222a, 223a after the curing.

Further, the body parts 120, 320, which may be heat-generated by the flow of the current, have the injection of the enhancing injection materials 222a, 223a during the secondary injection molding asymmetrically performed on one surface and the other surface thereof, such that the enhanced part for the enhancement may be formed only on one surface side of the body parts 120, 320. Accordingly, the other surface side of the body parts 120, 320 where the enhanced part is not formed may be exposed to the outside, which may be advantageous to dissipate the heat due to the heat generation.

Further, the enhanced part formed by the enhancing injection material may also be positioned at a position except for the sensing parts 110, 210, 310, 410, 510, 610. The cross-sectional area and the outer surface area of the flow direction of the current of the portion thickened by the enhancing injection material may be increased in the bus bars 20, 40, 50, 60, thereby enhancing the electrical conductivity and the heat dissipation property. Further, the sensing parts 110, 210, 310, 410, 510, 610 may be plated, and the plating may include at least one of gold, silver, nickel, zinc, tin, or the like and the electrical conduction property may be further enhanced by the plating.

FIG. 6 is a diagram illustrating a shape of a stacked bus bar 70 according to another embodiment of the present disclosure. FIG. 6 exemplarily illustrates a case where two frames have been stacked, but a case where three or more frames are stacked may also be applied to the following description.

Referring to FIG. 6, it may be an embodiment in which the insert injection is performed in a state where a plurality of frames have been stacked. For example, as a form of stacking a plurality of frames, body parts (42; 421a, 421b) and respective connection parts 412a, 412b of each frame may be stacked and the stacked frame may be inserted into the mold and injection-molded.

Here, the primary enhancing injection material 222a and the secondary enhancing injection material 223a to be injected during the injection molding may be injected into the lower surface and the upper surface of the stacked frame, respectively. In this example in which two frames have been stacked, the primary enhancing injection material 222a may be supplied to the body parts (42; 421b) positioned at the lower side thereof, and the secondary enhancing injection material 223a may be supplied to the body parts (42; 421a) positioned at the upper side thereof. Here, the enhancing injection materials 222a, 223a may be injected into a portion of the exposed areas of the stacked frame or the entire exposed area thereof.

When the enhancing injection materials 222a, 223a are injected into the portion, for example, the enhancing injection materials 222a, 223a may be supplied to a planar portion. The planar portion may include valleys 421a, 421b, a ridge 422a, and the like except for the curved parts 423a, 413a, 413b. A portion into which the enhancing injection materials 222a, 223a are injected may be performed for the purpose of enhancing the durability, or the like, as in the above-described embodiment.

Furthermore, the area into which the enhancing injection materials 222a, 223a are injected may further include the side surface of the stacked frame. The coupling between the respective frames may be made by injecting it by stacking a plurality of frames and then injecting the enhancing injection materials 222a, 223a into the surface including the side surface thereof. In addition to the coupling by the enhancing injection materials 222a, 223a, the coupling state contacting each other by a welding including a laser welding and an adhesive agent between the respective frames may be maintained.

Further, if the respective frames are coupled to each other by the enhancing injection materials 222a, 223a, the inflow of the enhancing injection materials 222a, 223a may be blocked between the respective frames. Accordingly, when being inserted into the mold, the stacked frame may coupled by being pressed to each other by a pressing means such as the bending so that the enhancing injection materials 222a, 223a are not injected between the respective frames.

Although the above-described embodiment has described an example in which the enhancing injection material is injected twice primarily and secondarily to enhance the frames 10, 30, an embodiment to be described below is an example of enhancing the enhanced part formed in the frames 10, 30 by injecting the enhancing injection material once.

Hereinafter, the same applicable points as those of the embodiment in which the enhancing injection material is injected in plural times (primary and secondary) as described above are omitted and different points will be mainly described later.

Figure 7A:
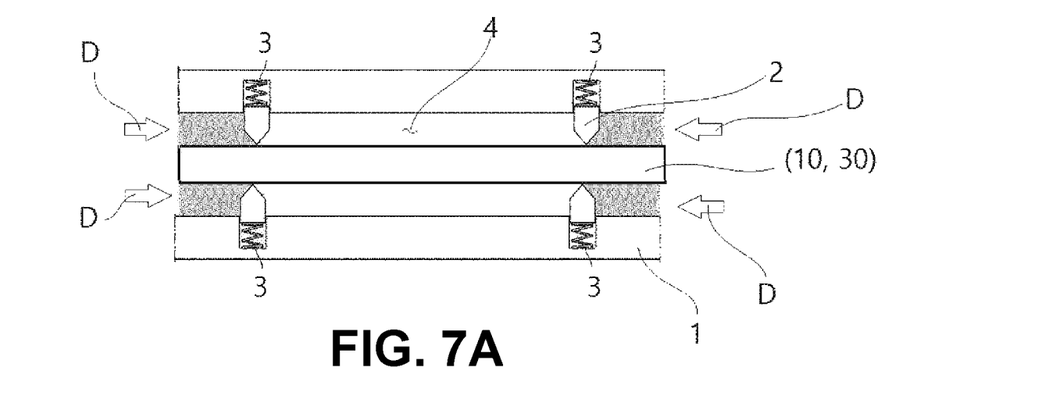
FIGS. 7A to 7C are diagrams illustrating the injection of an enhancing injection material according to embodiments of the present disclosure.
Figure 7B:
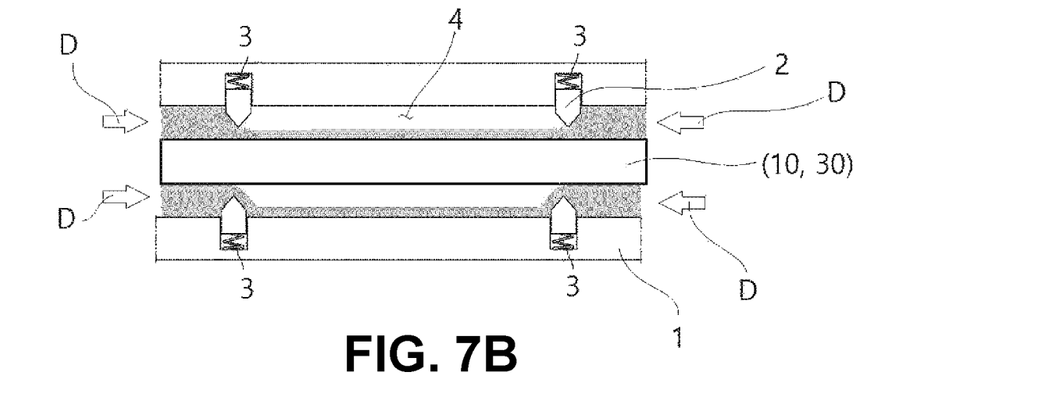
Figure 7C:
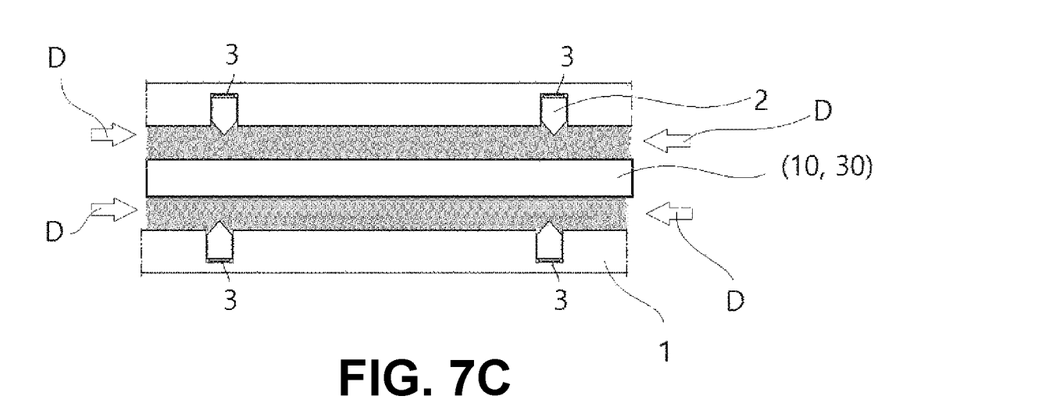

FIG. 7A to 7C are diagrams illustrating the injection of the enhancing injection material according to embodiments of the present disclosure, and referring to FIGS. 7A to 7C, the enhancing injection material may be injected after the frames 10, 30 have been mounted in the mold 1. Here, the mounting of the frames 10, 30 in the mold 1 means the mounting having a fixing force of the degree that the frames 10, 30 may maintain their positions in the mold 1 against the pressure generated when the enhancing injection material is injected.

For example, the mounting may be performed by one or more protrusions 2 formed in the mold 1. Specifically, the protrusion 2 may be coupled by the mold 1 and the elastic body 3. Accordingly, the protrusion 2 may receive the elasticity from the elastic body 3 in a direction of supporting the frames 10, 30 to press, mount, and fix the frames 10, 30 with a predetermined force.

Referring to FIG. 7A, the frames 10, 30 supported and fixed by the protrusion 2 are introduced into a cavity 4 in the mold 1 by the enhancing injection material, and the introduced enhancing injection material may be provided up to a position adjacent to the protrusion 2. Since the protrusion 2 may be a pin or cylinder shape, the enhancing injection material may be provided up to the periphery of the protrusion 2. If the projection 2 is pressed by the pressure of the enhancing injection material as in FIG. 7B, the protrusion 2 may be introduced into the mold 1. For the introduction, the protrusion 2 may have an inclined surface formed on the end portion in the pressing direction. The inclined surface is formed at an angle except for a direction parallel or perpendicular to a direction (D) of injecting the enhancing injection material, and may be formed in a direction of reducing the cross-sectional area as the protrusion 2 extends in the pressing direction. Accordingly, the enhancing injection material presses the inclined surface to introduce the protrusion 2 into the mold 1, and the positions of the frames 10, 30 may be maintained by the enhancing injection material.

If the enhancing injection material is injected by the above-described process and the enhancing injection material is cured, the frame may have the enhanced parts 213a, 221a formed at the position where the enhancing injection material has been injected. Although the enhancing injection material has been injected into the upper and lower surfaces with respect to the frames 10, 30 in this embodiment, the cavity 4 is formed only on one side surface according to the shape of the mold 1 to inject the enhancing injection material into the cavity 4 side. Accordingly, the position where the enhanced parts 213a, 221a are formed in the frames 10, 30 may be optional, and if the enhanced parts 213a, 221a are formed on the upper surface and the lower surface of the frames 10, 30, they may also be manufactured by injecting the primary and secondary enhancing injection materials, and may also be manufactured by injecting the enhancing injection material once.

As described above, although the representative embodiments of the present disclosure have been described in detail, it will be understood by those skilled in the art to which the present disclosure pertains that various modifications to the above-described embodiments may be made without departing from the scope of the present disclosure. Accordingly, the scope of the present disclosure should not be limited to and defined as the embodiment described, and should be defined by not only the appended claims set forth below but also equivalents of the claims.

The invention claimed is:

1. A method for manufacturing a bus bar,
wherein a frame comprising a sensing part and a body part connected to the sensing part is prepared,
wherein the frame is inserted into and fixed to an injection molding mold,
wherein an enhanced part is formed in the frame in order to improve the degree of one or more of the strength and the insulation at one or more positions of a position where fatigue is concentrated and a position capable of electrical conduction by an enhancing injection material injected into the injection molding mold,
wherein the enhancing injection material comprises a primary enhancing injection material and a secondary enhancing injection material injected sequentially, and
wherein one surface of the frame is enhanced through a primary injection molding by injecting the primary enhancing injection material therein, and the other surface of the frame is enhanced through a secondary injection molding by injecting the secondary enhancing injection material therein.

2. The method for manufacturing the bus bar of claim 1, wherein the insertion and the fixing are performed by a protrusion in the injection molding mold, and
wherein the protrusion is introduced into the injection molding mold by the supply pressure of the enhancing injection material.

3. The method for manufacturing the bus bar of claim 1, wherein the enhancing injection material is injected into the injection molding mold once to form the enhanced part in the frame.

4. The method for manufacturing the bus bar of claim 3, wherein the fatigue occurs in a direction in which the frame is repeatedly bent.

5. The method for manufacturing the bus bar of claim 4, wherein the fatigue occurs at one or more positions of the body part and the sensing part.

6. The method for manufacturing the bus bar of claim 4, wherein the frame further comprises a connection part connecting between the sensing part and the body part.

7. The method for manufacturing the bus bar of claim 6, wherein the fatigue occurs at one or more positions of the body part, the sensing part, and the connection part.

8. The method for manufacturing the bus bar of claim 1, wherein the fatigue occurs in a direction in which the frame is repeatedly bent.

9. The method for manufacturing the bus bar of claim 8, wherein the fatigue occurs at one or more positions of the body part and the sensing part.

10. The method for manufacturing the bus bar of claim 8, wherein the frame further comprises a connection part connecting between the sensing part and the body part.

11. The method for manufacturing the bus bar of claim 10, wherein the elasticity is provided by a curved part prepared on the connection part.

12. The method for manufacturing the bus bar of claim 1, wherein the frame is formed with a groove that may be fixed by a protrusion formed in the injection molding mold so that an insert position is fixed during the primary injection molding and the secondary injection molding.

13. The method for manufacturing the bus bar of claim 1, wherein the frame comprises an irregularity part enhancing the adhesion with the primary enhancing injection material and the secondary enhancing injection material.

14. The method for manufacturing the bus bar of claim 1, wherein the primary enhancing injection material and the secondary enhancing injection material are different materials from each other.

15. The method for manufacturing the bus bar of claim 1, wherein the frame is manufactured in a state where the frame and a guide have been connected, and
wherein the guide and the frame are connected by a notch to separate the frame and the guide with respect to the notch after the secondary injection molding.

16. A bus bar, comprising:
a sensing part;
a connection part having one side coupled to the sensing part;
a body part coupled to the other side of the connection part; and
an enhanced part formed at one side thereof in the body part and the connection part, and enhancing one or more of the strength and the insulation at one or more positions in the connection part and the body part,
wherein a frame comprises the body part, and a layer of an enhancing injection material is formed on one surface of the frame and another layer of another enhancing injection material is formed on another surface of the frame.

17. A bus bar, comprising:
a sensing part;
a connection part having one side coupled to the sensing part;
a body part coupled to the other side of the connection part; and
an enhanced part enhancing one or more of the strength and the insulation in the connection part and the body part,
wherein the body part is prepared in plural and stacked on each other, and the enhanced part is formed on a portion of an exposed surface in a state where the body part has been stacked on each other,
wherein a frame comprises the body part, and a layer of an enhancing injection material is formed on one surface of the frame and another layer of another enhancing injection material is formed on another surface of the frame.

* * * * *